April 24, 1928.
J. R. DELANEY
1,666,927
METER WINDOW FRAME
Filed May 9, 1927
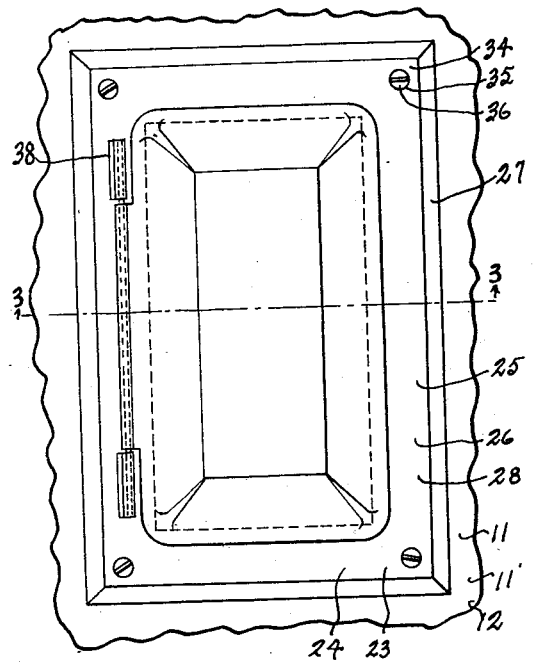
Fig. 1.
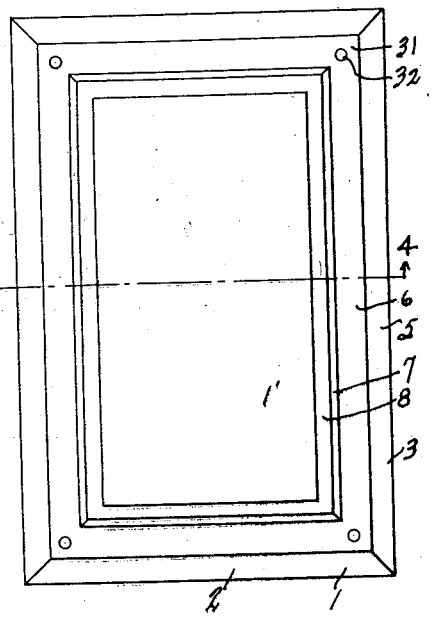
Fig. 2.
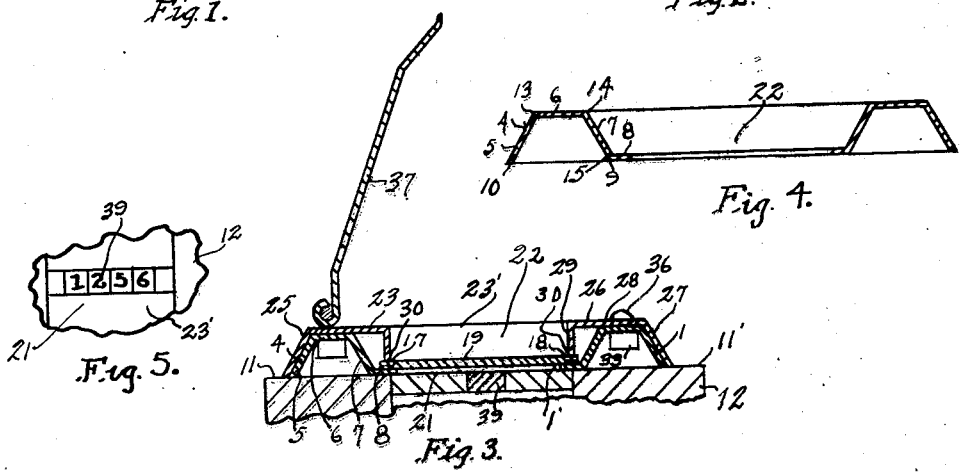
INVENTOR.
JOSEPH ROBERT DELANEY
BY
*Lee J. Parker.*
ATTORNEY.

Patented Apr. 24, 1928.

1,666,927

UNITED STATES PATENT OFFICE.

JOSEPH ROBERT DELANEY, OF CINCINNATI, OHIO.

METER-WINDOW FRAME.

Application filed May 9, 1927. Serial No. 190,124.

The invention relates to frames of windows through which numerical characters of meters are observed.

Heretofore, the usual gas meters, water meters, and the like, have been equipped with fixed and sealed glass windows for permitting persons to observe the numerical characters thereof which indicate the quantity consumption of the product which operates the mechanism of the meter. The said glass windows usually are attached to the meters by means which necessitate disconnecting the meter from the pipe lines and conveying it to a place conveniently equipped with the required tools and other apparatus when the glass or other transparency in the window becomes broken or otherwise defective. This procedure is quite expensive because of the time and labor consumed. Moreover, a considerable surplus of meters must be carried in stock, by the owners of the product measured by the meters, to compensate for the need of extra meters exchanged for those removed for repairs.

Therefore, the objects of the invention are to provide simple, economical, efficient and practical means whereby broken, damaged and defective glass, or other transparency, in the windows of gas meters, water meters and the like, may be quickly and conveniently removed therefrom and other transparency substituted therefor without the necessity of disconnecting said meter from the pipe lines or otherwise interfering with the usual passage through the meter of the product contained by said pipe lines or otherwise interfering with the usual passage through the meter of the product contained by said pipe lines; and to provide means adapted to securely seat said window and prevent leakage of the gas, water or other product passed through the meter.

The invention consists in the combination, arrangement of the parts and in the details of the construction, as herein set forth and claimed.

In the drawings:

Fig. 1 is a plan view of the invention shown attached to a meter partly broken away;

Fig. 2 is a plan view of the main frame;

Fig. 3 is a section taken on a line corresponding to 3—3 in Fig. 1;

Fig. 4 is a section taken on a line corresponding to 4—4 in Fig. 2, and showing the lid in open position;

Fig. 5 is a plan view of Fig. 3, with parts broken away; and

Fig. 6 is an enlarged sectional view, with parts broken away, showing the glass, support, gasket and ledge.

In the preferred construction of the invention I provide main-frame 1 consisting of integrally connected ends 2 and sides 3, whereby window or aperture 1' is formed. Each of the ends and sides of the main-frame comprises channeled section 4 consisting of integrally connected plates 5, 6, 7 and ledge 8. The inner edges 9 and 10 of the inner and outer inclined plates 7 and 5 engage the outer surface 11 of the casing 11' of gas meter, water meter, or the like, 12. The outer and inner inclined plates 5 and 7 are inclined toward each other and extend outwardly from the meter. The outer edges 13 and 14 of the plates 5 and 7 are integrally connected with the plate 6 which extends in spaced apart parallel relation to the outer surface 11 of the casing of the meter. Extending inwardly of the frame and parallel with intermediate plate 6 is ledge 8 integrally connected with the lower edge 15 of the plate 7.

In continuous engagement with the outer side 16 of the ledges 8, of the ends 2 and sides 3 of the frame, is gasket 17 supporting the outer edges 18 of glass, or other suitable transparency, 19.

In applying my invention to practical usage the lower sides 20 of ledges 8 are soldered, or otherwise suitably secured, in continuous contact with the outer surface 11, of the casing of the meter, after positioning the frame 1 with window 1' in registering relation with the window 21 of the meter.

The gasket 17 then is placed upon the ledges 8 and in continuous contact therewith, as shown in Fig. 3, or as shown in Fig. 6, after which operation the glass 19 is positioned within recess 22 of the frame and upon the gasket with its outer edges 18 in contact with or adjacent the outer sides 7' of plates 7.

For the purpose of maintaining the glass 19 in close engagement with the gasket 17, I provide sub-frame 23 comprising integrally formed ends 24 and sides 25, whereby window 23' of the sub-frame is formed.

Each end 24 and side 25 of the sub-frame consists of channeled section 26 comprising integrally connected inclined plate 27, intermediate plate 28, and support 29. The sub-frame 23 is approximately the same dimensions as frame 1, whereby the sub-frame may be super-imposed upon the main frame 1, as shown in Figs. 2 and 3, in which position the plates 27 and 28, respectively of the sub-frame, are parallel with plates 5 and 6 of frame 1, and the support 29 extends perpendicular with glass 18 having its outer edges engaged by the lower edges 30 of the plates 29.

For the purpose of maintaining the lower edges 30 of the plates 29 in close contact with the outer edge of the glass, so that the outer edges of the glass are forced in sealing engagement with gasket 17, at each corner 31 of main-frame 1 is hole 32 registering with the corresponding nut 33 which is suitably fixed to the inner sides of the intermediate plates 6.

In each corner 34 of frame 23 is a hole at 35 registering with the corresponding hole 32 in frame 1, whereby bolts 36, respectively, threaded to nuts 33, and received by holes 32 and 35, are adapted to maintain the sub-frame in fixed relation to main frame 1 and in close contact with glass 18, thereby sealing the window 1′ of frame 1.

To safe-guard the glass against breakage, or other damage, the lid 37 is suitably hinged to the bosses 38 fixed to the outer side of sub-frame 23. When the lid is in the open position, as shown in Fig. 3, the usual numerical characters of the meter are readily observed through the glass 18.

When it is desired to remove the glass 18, it simply is necessary to manually unscrew bolts 36 from engaging relation with nuts 33, whereby the sub-frame 23 may be readily removed from contact with frame 1, and the glass 18 can be removed from window 1′ and another glass may be readily and conveniently substituted therefor.

It is apparent that I have invented a highly desirable invention for the purposes intended, and by the use of which a damaged glass or other transparency may be removed from the meter and another glass can be substituted to make visible the characters of the meter without disconnecting the meter from the pipe lines.

It is important that, while I believe that the forms of the invention comprising the invention and the structure thereof, as illustrated in the drawings and referred to in the above description, is the most efficient and practicable, yet realizing that the conditions concurrent with the adoption and utilization of the device will necessarily vary, I desire to emphasize the fact that the forms and constructions as shown and described merely are presently preferred as being the most practical, and it is understood that changes in the details of the various parts may be resorted to, when advantageous and desirable, without departing from the spirit of the invention when such changes and alterations fall within the spirit and scope of the appended and final claims.

What I claim as new and desire to secure by Letters Patent is:

1. The combination with a casing having a window, of a main-frame secured in sealing relation to said casing and having a window registering with said first mentioned window, a glass in said window in said main-frame, a sub-frame releasably secured to said main-frame and engaging said glass, to releasably maintain said glass in its position.

2. The combination with a casing having a window, of a main-frame secured to said casing and having a window registering with the first mentioned window, a transparency in said window in said frame, a superframe having a window therein registering with said last mentioned window, and means to releasably maintain said transparency in said main-frame window.

3. The combination with a casing having a window, of a main-frame secured in sealing relation to said casing and having a window registering with the first mentioned window, a transparency in said window in said frame, a superframe having a window therein registering with said last mentioned window and engaging said transparency, and means to releasably maintain said transparency in said main-frame window.

4. The combination with a casing having a window, of a main-frame secured to said casing and having a window for practical purposes registering with the first mentioned window, a transparency in said window in said frame, a superframe having a window therein for practical purposes registered with said last mentioned window and engaging said transparency, and means to releasably maintain said transparency in said main-frame window.

5. In a device of the class described, a main-frame comprising connected channeled end sections and side sections, and a ledge integrally connected with one of said plates, the lower sides of the ledges being fixed to the outer surface of said meter, a super-frame comprising ends and sides and having a window registering with said window in said meter, said super-frame comprising connected channeled end sections and side sections, and each of said last mentioned sections having a support formed therewith, a glass supported by said ledges, and means fixing said super-frame to said main frame and said meter whereby said supports are maintained in close engagement with the outer edges of said glass thereby forcing said glass in contact with said ledge to seal the space between said main-frame and said glass.

6. Means for holding a glass in the window of a meter, said means comprising a main-frame having a window registering with said meter window, said main-frame comprising connected channeled end sections and side sections, each of said sections comprising a parallel plate spaced apart from the outer surface of said meter, an inner and outer plate inclined inwardly toward each other and integrally connected with said first mentioned plate, and a ledge integrally connected with the inner edge of said inner inclined plate, the lower sides of the ledges being fixed to the outer surface of said meter, a gasket supported by said ledges, a super-frame comprising ends and sides, and having a window adapted to register with said window in said meter, said super-frame comprising channeled end sections and side sections integrally connected with each other and each of said super-frame sections comprising an intermediate plate extending parallel with the outer surface of said meter, a plate integrally connected to the last mentioned intermediate plate and extending parallel with the said outer inclined plate, a support plate extending at right angles to said last mentioned intermediate plate and having its outer edge integrally connected with said intermediate plate, a glass supported by said gasket, and means fixing said super-frame to said main-frame and said means adapted to maintain the support in close engagement with the outer edges of said glass, whereby said glass is forced in close contact with said gasket to seal the space between said main-frame and said glass.

7. Means for holding a glass in the window of a casing comprising a main frame having a window registering with said meter window, said main-frame comprising connected channeled end sections and side sections, each of said sections comprising a plate spaced apart from the outer surface of said meter, an inner and outer plate inclined inwardly toward each other and integrally connected with said first mentioned plate, and a ledge integrally connected with the inner edge of said inner inclined plate, the lower sides of the ledges being fixed to the outer surface of said meter, a gasket supported by said ledges, a super-frame comprising ends and sides, and having a window registering with said window in said meter, said super-frame comprising connected channeled end sections and side sections, and each of said super-frame sections comprising an intermediate plate extending parallel with the outer surface of said meter, a plate integrally connected to the last mentioned intermediate plate and extending parallel with the said outer inclined plate, a support extending at right angles to said last mentioned intermediate plate and having its outer edge integrally connected with said intermediate plate, a glass supported by said gasket and manually operative means releasably fixing said super-frame to said main frame and said means adapted to maintain the supports in close engagement with the outer edges of said glass, whereby said glass is forced in close contact with said gasket to seal the space between said main-frame and said glass.

8. Means for holding glass in the window of a meter comprising a main-frame having a window registering with said meter window, said main-frame comprising connected channeled end sections and side sections, each of said sections comprising a parallel plate spaced apart from the outer surface of said meter, an inner and outer plate integrally connected with said first mentioned plate, and a ledge integrally connected with the inner edge of said inner inclined plate, the lower sides of the ledges being fixed to the outer surface of said meter, a gasket supported by said ledges, a super-frame comprising ends and sides and having a window adapted to register with said window in said meter, said super-frame comprising channeled end sections and side sections integrally connected with each other and each of said super-frame sections comprising an intermediate plate extending parallel with the outer surface of said meter, a plate integrally connected to the last mentioned intermediate plate and extending parallel with the said outer plate, a support extending at right angles to said last mentioned intermediate plate and having its outer edge integrally connected with said intermediate plate, a glass supported by said gasket and engaging the inner edges of the supports, and means fixing said super-frame to said main-frame whereby said supports are maintained in close engagement with the outer edges of said glass, thereby forcing said glass in close contact with said gasket to seal the space between said main-frame and said glass.

9. Means to releasably maintain the glass in a meter window, comprising a main-frame secured to said meter and having a window registering with the meter window, a glass received by said main frame, a sub-frame super-imposed on said main-frame to maintain said glass in its position, and releasable means maintaining said sub-frame in its position.

10. Means to releasably maintain transparency in a casing window, comprising means secured to said casing and having an aperture registering with said window, a transparency registering with said window and said aperture, and means releasably maintaining said transparency in registering position with said window and said aperture.

JOSEPH ROBERT DELANEY.